(12) United States Patent
Migos et al.

(10) Patent No.: US 7,671,840 B2
(45) Date of Patent: *Mar. 2, 2010

(54) USER INTERFACE CONTROL FOR CHANGING A PARAMETER

(75) Inventors: Charles Migos, San Francisco, CA (US); Patrick Heynen, Redwood City, CA (US); Jean-Pierre Mouilleseaux, Venice, CA (US); Gregory E. Niles, Culver City, CA (US); Egan Schulz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/470,461

(22) Filed: May 21, 2009

(65) Prior Publication Data

US 2009/0235198 A1    Sep. 17, 2009

Related U.S. Application Data

(63) Continuation of application No. 10/826,234, filed on Apr. 15, 2004, now Pat. No. 7,554,521.

(51) Int. Cl.
*G09G 5/00*    (2006.01)
(52) U.S. Cl. ...................... 345/156; 715/787
(58) Field of Classification Search ................ 345/156, 345/163; 715/772, 773, 833, 786, 787
See application file for complete search history.

(56) References Cited

U.S. PATENT DOCUMENTS

| | | | | |
|---|---|---|---|---|
| 4,926,360 | A * | 5/1990 | Spink, Jr. | 702/88 |
| 5,822,123 | A * | 10/1998 | Davis et al. | 725/43 |
| 5,920,477 | A * | 7/1999 | Hoffberg et al. | 382/181 |
| 5,995,079 | A * | 11/1999 | Sheasby et al. | 715/856 |
| 6,340,966 | B1 * | 1/2002 | Wang et al. | 345/163 |
| 6,477,271 | B1 * | 11/2002 | Cooper et al. | 382/167 |
| 7,003,732 | B1 * | 2/2006 | Zhaksilikov | 715/771 |
| 7,162,701 | B1 * | 1/2007 | Seyffert | 715/854 |
| 7,173,619 | B2 * | 2/2007 | Hill et al. | 345/428 |
| 7,358,963 | B2 * | 4/2008 | Low et al. | 345/175 |
| 7,415,457 | B2 * | 8/2008 | Dombroski et al. | 707/3 |
| 7,443,382 | B2 * | 10/2008 | Koo et al. | 345/163 |
| 7,493,310 | B2 * | 2/2009 | Eryurek et al. | 707/3 |
| 7,548,239 | B2 * | 6/2009 | Hill et al. | 345/428 |
| 7,554,521 | B1 * | 6/2009 | Migos et al. | 345/156 |
| 7,555,456 | B2 * | 6/2009 | Rosenthal et al. | 705/37 |

\* cited by examiner

*Primary Examiner*—Ricardo L Osorio
(74) *Attorney, Agent, or Firm*—Fenwick & West LLP

(57) ABSTRACT

A user interface comprises a control for adjusting a numeric field value. The control includes controls for editing the numeric field text directly and for dynamically incrementing and decrementing the value. In addition, the control includes controls for combining several functions into one control, allowing for quicker numeric value editing, control of multiple parameters, and taking up less user interface space.

21 Claims, 3 Drawing Sheets

Slider (50)

USER INTERFACE CONTROL FOR CHANGING A PARAMETER

RELATED APPLICATIONS

This application is a continuation of U.S. application Ser. No. 10/826,234, filed Apr. 15, 2004.

FIELD OF THE INVENTION

This invention relates to controlling a parameter value via user interface, and more particularly, to a flexible, dynamic slider control for controlling parameters in a software application.

BACKGROUND

In a software application environment, user interfaces often contain a number of controls for manipulating the interface. These may include several different types of controls and sliders for influencing the value of various parameters of the interface. One example is a text entry control for directly typing a numeric value into a field of the control. Another example is a control for dynamically incrementing and decrementing a value by moving a control along a single axis, often referred to as a slider. By moving the slider, the value displayed in a separate control is dynamically changed. A final example is a key on a keyboard for stepwise incrementing and decrementing a value in a control at a consistent granularity. By pressing the key, for example an up or down cursor arrow, the value displayed in a control is changed in a stepwise manner.

Conventionally, a single control influences a single parameter. Therefore, if a user desires to effect the same change in more than one aspect or parameter, the user must separately manipulate the controls that correspond to each respective parameter. Traditionally, the controls are poorly integrated within the interface, forcing the user to switch between the various controls and/or perform several steps to achieve a desired result.

Some programs, such as animators' tools and other image manipulating systems, may have a large number of controls and may require an extensive amount of numeric entry and direct numeric editing to effect even minor changes. For example, in an image manipulation application, user interface controls often are provided for manipulating parameters of images or graphic objects. A user may use a trial-and-error process to find the value that creates a desired effect for a particular parameter, trying numerous values in the process. Traditional user interface controls keep no record of these values. As a result, if a user wants to recall a value previously entered into a particular control, the user must manually keep a record of entered values.

These characteristics of traditional user interface controls increase the amount of time the user spends entering and editing values. In addition, the need for a large number of controls and sliders takes up valuable user interface space.

SUMMARY OF THE INVENTION

The present invention eliminates the need for the user to switch between various controls to achieve a desired result. To do this, several functionalities are combined into one control. This combination allows for quicker numeric value editing, control of multiple parameters, and provides for both an input and an output function in a compact space.

In one embodiment, a numerical value displayed in a control can be changed in several different ways. A value can be entered, the value can be dynamically incremented or decremented, the value can be stepwise incremented or decremented, and the value resulting from these manipulations can be displayed, all within one on-screen control.

In one embodiment of the present invention includes a function for changing the granularity with which values are incremented and decremented. By using various modifier keys while dynamically or stepwise incrementing or decrementing a value, the value displayed increments or decrements at increased or reduced levels of granularity depending on the modifier used.

One embodiment allows for user selection of values recently displayed in a control via a contextual menu. In response to a user command, a contextual menu populates with a list of recent values from which the user can select. The selected value is then displayed in the control.

In one embodiment, the user can manipulate the control without first clicking on it. In response to a user positioning a pointer over the control for a predetermined length of time, referred to as hovering, the control is ready to respond to manipulations. For example, if a user hovers over the control and scrolls the mouse wheel, the value displayed in the control increases or decreases.

When more than one control is used in an interface, one embodiment allows the values of multiple controls to be changed simultaneously. For example, in response to the user selecting two or more controls and manipulating of one of the selected controls, the values of all selected controls change to reflect the manipulation.

In one embodiment, the user can quickly move from one control to another. For example, in response to a user hitting a key while a first control is selected as ready to receive a value, the first control is deselected and a second control is selected to receive a value.

One embodiment allows the user to drag and drop values form one control to another. In response to a user selecting a value from a first control and dragging it to a second control, the value from the first control also is displayed in the second control.

Some or all of these additional functionalities may be combined in a single control. The integration of these functionalities allows the user to perform more functions in fewer steps, with less redundancy, and in less time.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Integrated User Interface

Figure 1:
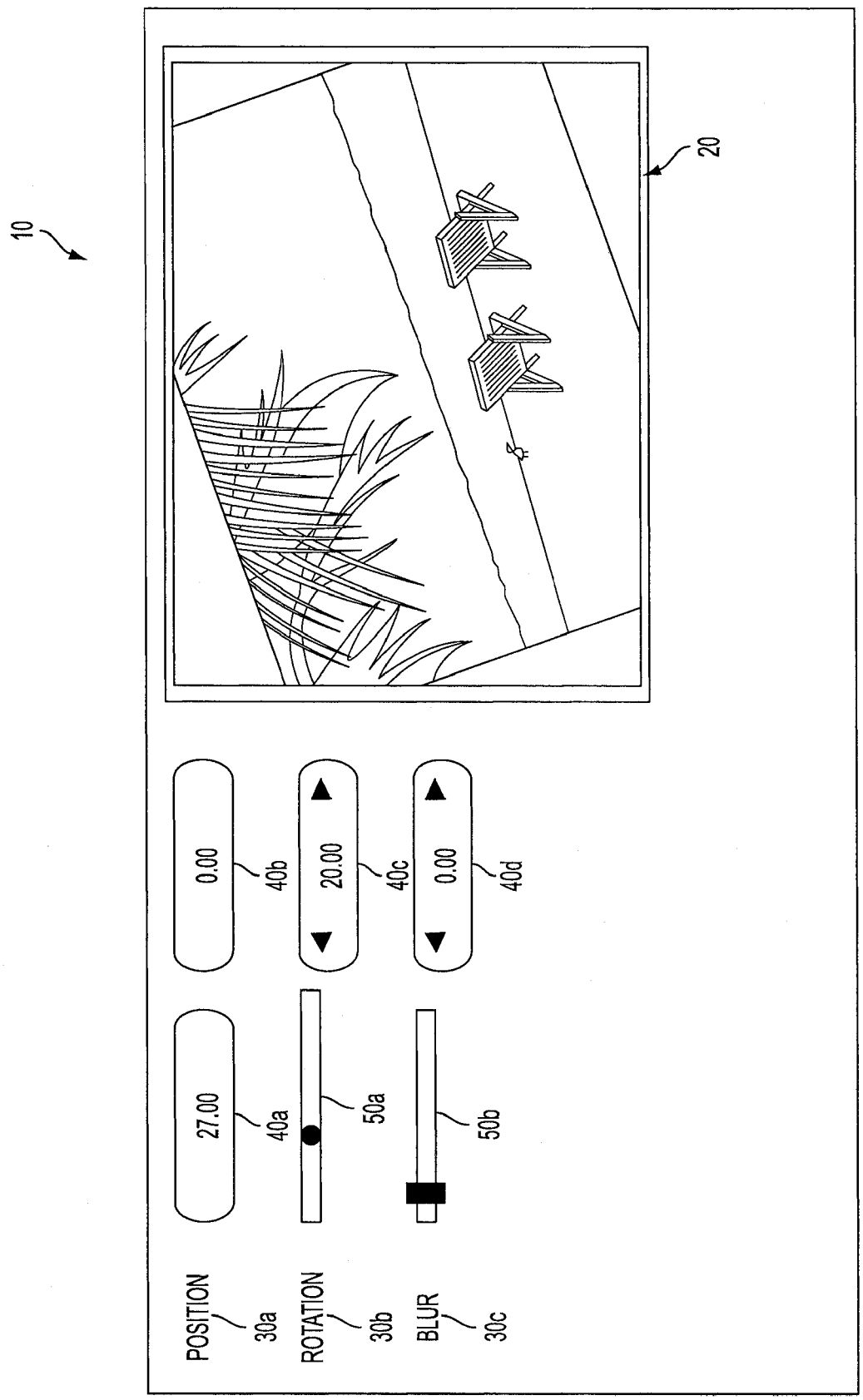
FIG. 1 is an illustration of a user interface in accordance with one embodiment of the present invention.

Referring now to FIG. 1, a user interface 10 is shown in accordance with one embodiment of the present invention. The user interface 10 includes an image display area 20, one or more parameters 30, the parameters 30 controlled by one or more controls 40 and/or sliders 50.

In one embodiment, the display area 20 includes an image or graphic, such as the photograph displayed in FIG. 1. The image or graphic in the display area 20 may be manipulated using controls 40a-d and/or sliders 50a-b corresponding with various parameters 30a-c. A parameter 30 is an aspect of the image or graphic in the image display area 20 subject to manipulation. In this example, the parameters 30 are Position 30a, Rotation 30b, and Blur 30c. A control 40 manipulates the value of a parameter 30 corresponding with that control 40. For example, Position 30a is controlled by controls 40a-b. In one embodiment, a slider 50 may be used in conjunction with a control 40 to manipulate a parameter 30. For example, Rotation 30b may be manipulated by both control 40c or slider 50a. When the user manipulates a parameter 30 using a control 40 or slider 50, changes are reflected in the display area 20.

Control Structure

Referring now to FIG. 2, there is shown an illustration of a control 40 of a user interface 10 in greater detail in accordance with one embodiment of the present invention. In addition, there is shown a graphical pointer 205 directable by the user via a graphical control device such as a mouse.

Figure 2A:
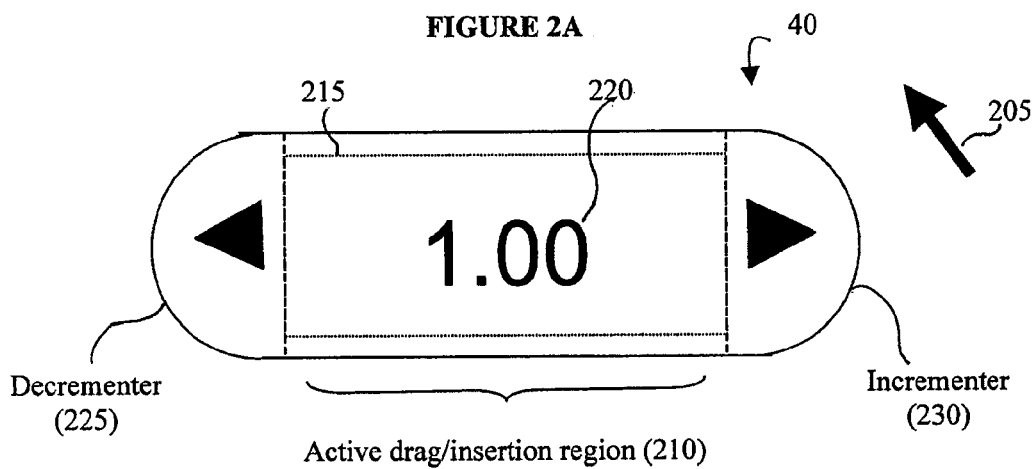
FIG. 2A is an illustration of a user interface control in accordance with one embodiment of the present invention.

With reference to FIG. 2A, the control 40 includes a drag/insertion region 210, which is in the center of the control 40 and includes a text box 215 for displaying a numeric value 220. In some embodiments, the control 40 also may comprise two additional regions: a decrementer region 225, which displays, in this example, a left-pointing arrow; and an incrementer region 230, which displays, in this example, a right-pointing arrow. The dotted lines of FIG. 2A are merely to indicate the boundaries of the regions 210, 225, 230 and normally would not be visible to the control 40 user.

Figure 2B:
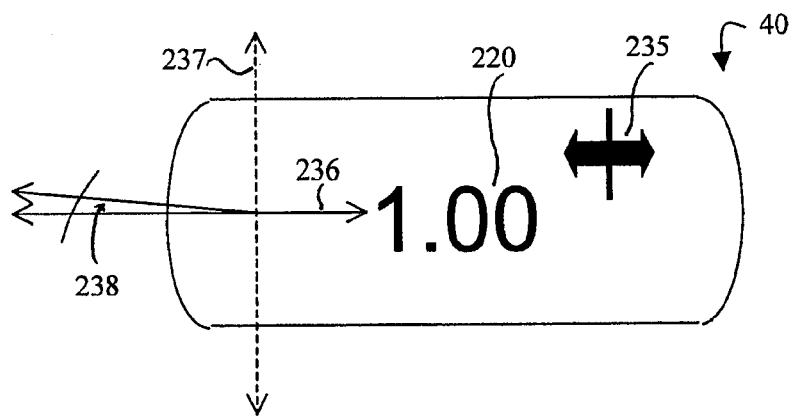
FIG. 2B is an illustration of a user interface control with a modified pointer/cursor in accordance with one embodiment of the present invention.

Referring now to FIG. 2B, there is shown an illustration of a control 40 with a modified pointer/cursor 235 in accordance with one embodiment of the present invention. In this example, the control 40 does not include a decrementer 225 or an incrementer 230. The modified pointer/cursor 235 is a graphical pointer similar to the graphical pointer 205 of FIG. 2A, with added dragging functionality as described below. In this example, the modified pointer/cursor 235 is shown as a cursor with two arrows pointing in opposite directions and is displayed within the drag/insertion region 210.

Figure 2C:
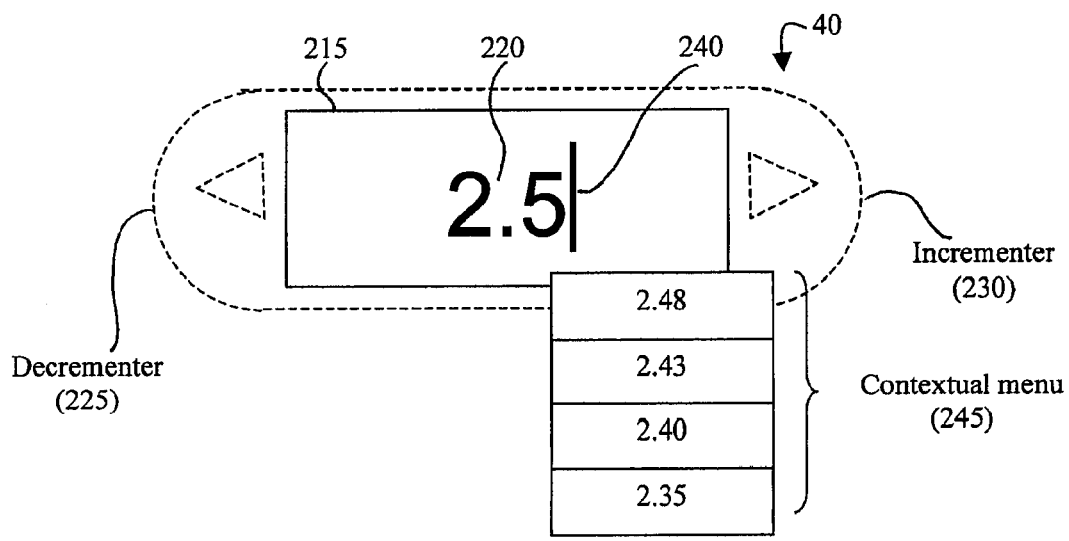
FIG. 2C is an illustration of a user interface control with a standard cursor in accordance with one embodiment of the present invention

Referring to FIG. 2C, there is shown an illustration of a control 40 with a standard cursor 240 in accordance with one embodiment of the present invention. The standard cursor 240 is the form that the graphical pointer 205 of FIG. 2A takes when the drag/insertion region 210 is in text edit, or "active" mode. The standard cursor 240 is displayed within the text box 215 in the drag/insertion region 210. The standard cursor 240 allows the user to type and delete numerals within the text box 215, as well as perform standard editing operations such as insert, copy, cut, and paste. When the standard cursor 240 is and the drag/insertion region 210 is in text edit mode, the remainder of the control 40 display, including the incrementer region 230 and decrementer region 225, if any, are displayed as inactive background, shown here as dotted lines. In one embodiment, the remainder of the control 40 is grayed out. In another embodiment, no change is visible. In one embodiment, the control 40 also may include the ability to display a contextual menu 245 for various purposes, as will be described in greater detail below.

The graphical or visual organization and placement of the regions 210, 225, 230 in the control 40 of FIG. 2 is merely illustrative and not limited by the present invention, and variations in the placement, size, and shape of the regions 210, 225, 230 and the control 40 would be readily apparent to those of skill in the art of user interface design. For example, in a different embodiment the control 40 takes a vertical orientation, with the incrementer region 230 placed above the drag/insertion region 210 and displaying an upward-pointing arrow, and the decrementer region 225 placed below the drag/insertion region 210 and displaying a downward-pointing arrow. Other configurations also are possible.

Figure 3:
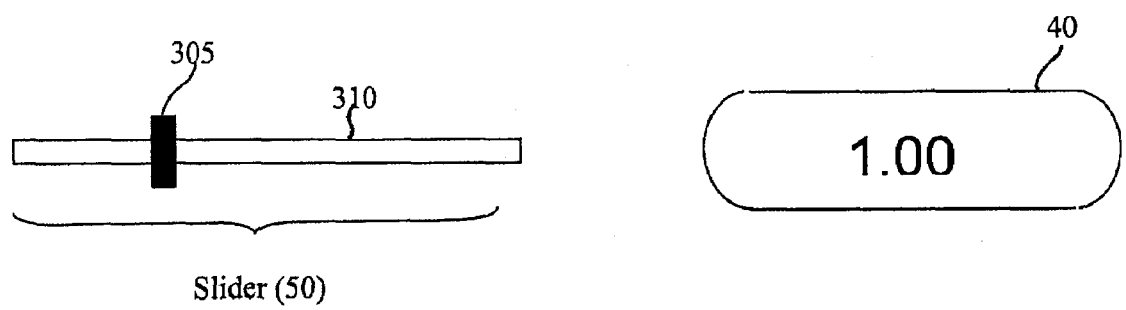
FIG. 3 is an illustration of a user interface control paired with a slider in accordance with one embodiment of the present invention.

In addition, in some embodiments the control 40 may be accompanied by additional user interface 10 aspects. For example, the control 40 may be paired with a traditional slider 50, as depicted in FIG. 3, in order to provide multiple methods for controlling a particular parameter value 220. A slider 50 in its most basic form is a device for manipulating the value of a particular parameter 30. The slider 50 includes a control bar 305 that moves, in this example horizontally, on a slide bar 310. A single interface also may contain multiple controls 40, allowing for control of multiple parameters 30, as shown in FIG. 1. The operation of the slider will be discussed below.

Figure 4:
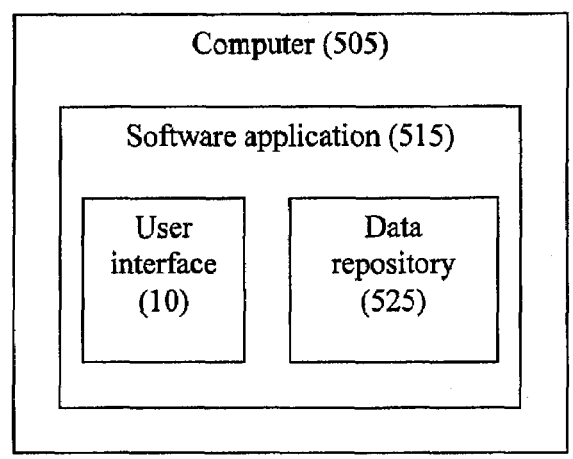
FIG. 4 is an illustration of the architecture of a system for implementing a user interface in accordance with one embodiment of the present invention.

Referring now to FIG. 4, it illustrates the architecture of a system 500 for implementing a user interface 10 in accordance with one embodiment of the present invention. In such a system, a computer 505 is of conventional design, and includes a processor, an addressable memory, and other conventional features (not illustrated) such as a display, a local hard disk, input/output ports, a keyboard, a mouse, and a network interface. The user interface 10 is shown on the display. In a preferred embodiment the computer 505 may be implemented on a Macintosh computer operating under an operating system such as Macintosh OS X, or a SPARC-based computer operating under UNIX, or any other equivalent devices.

In accordance with the present invention, the computer 505 executes a software application 515, which includes a user interface 10 according to one embodiment of the present invention. The application 515 includes a number of executable code portions and data files. These include code for creating and supporting the user interface 10, handling input and generating output.

In accordance with the present invention, the application 515 maintains a data repository 520 for storing information relating to the user interface 10. The repository 520 may be a conventional database accessible by the application 515 through the user interface 10. The application 515 accesses and queries the repository 520 to retrieve data records associated with the user interface 10.

The application 515 may be provided to the client computer 505 on computer readable media, such as a CD-ROM, diskette, or by electronic communication over the network 510 from software distributors, for installation and execution thereon. Alternatively, the application 515 and data repository 520 can be hosted on a server computer, and accessed over the network 510 by the user, for example using a browser interface to the application 515.

Control Operation

The operation of the control 40 in accordance with one embodiment of the present invention will now be described with reference to FIG. 2 and Table 1. In one embodiment, the control 40 combines three separate functionalities that effect the numeric value 220 displayed in the text box 215: dynamic incrementing and decrementing, direct text editing, and stepwise incrementing and decrementing.

TABLE 1

| Starting Location of Pointer | Activity of Pointer | Type of Pointer Displayed | Result of Activity |
| --- | --- | --- | --- |
| Drag/Insertion Region | None | Modified Pointer/Cursor | None |
| Drag/Insertion Region | Click and Drag in a First Direction (User can move anywhere on the screen) | Modified Pointer/Cursor | Numeric Value Dynamically Decrements |
| Drag/Insertion Region | Click & Drag in a Second Direction (User can move anywhere on the screen) | Modified Pointer/Cursor | Numeric Value Dynamically Increments |
| Text Box | Single Click, Depress Return Key, or Double Click | Standard Cursor | Text Box Activated, Remainder of Control Inactive |
| Text Box | Single Click, Return Key, or Double Click and Then Type | Standard Cursor | Numeric Value Edited Consistent With Typing |
| Decrementer Region | Single Click | Graphical Pointer | Numeric Value Decrements One Step |
| Incrementer Region | Single Click | Graphical Pointer | Numeric Value Increments One Step |

The dynamic incrementing and decrementing functionality of the control 40 allows the user to dynamically increase or decrease the numeric value 220 displayed in the text box 215 of FIG. 2B. A summary of this functionality is shown in the first three rows of Table 1. As used here, "dynamically" refers to an increase or decrease at a relatively small level of granularity.

To dynamically increase or decrease the numeric value 220, the user first moves the graphical pointer 205 to the drag/insertion region 210 using a graphical control device such as a mouse. The graphical pointer 205 then converts to a modified pointer/cursor 235 as shown in FIG. 2B. The user single clicks within the drag/insertion region 210, holding down the click button. The user then moves the mouse, dragging the modified pointer/cursor 210, which results in dynamically increasing or decreasing the numeric value 220, depending on which direction the cursor 235 is dragged, for example, to the left or to the right. When the user releases the mouse button, the numeric value 220 displayed in the text box 215 remains displayed and the modified pointer/cursor 235 returns to a graphical pointer 205. In one embodiment, dragging within a predetermined distance, referred to herein as a tolerance threshold, has no effect. Thus, only when the mouse is moved beyond this threshold will the value 220 dynamically increase. In one embodiment, the tolerance threshold is three pixels. In one embodiment, the user may modify the tolerance threshold. One embodiment allows the user to drag anywhere on the display screen, while continuing to control the value 220.

Referring now to FIG. 2B as an example, if the modified pointer-cursor 235 is dragged in a first direction (e.g., to the right), the displayed numeric value 220 dynamically increases. Likewise, if the modified pointer/cursor 235 is dragged in a second direction (e.g., to the left), the displayed numeric value 220 dynamically decreases. In addition, the acceleration at which the user moves the modified pointer/cursor 235 has no effect on the scaling, which remains consistent.

In one embodiment, any movement of the modified pointer/cursor 235 along the axis perpendicular (shown here as the y-axis 237) to that used to change the value 220 (shown here as the x-axis 236) is ignored. In the above example, the axis used to change the value (236) is horizontal (right and left); therefore movement along the vertical axis (237) is ignored.

In one embodiment, only movement of the modified pointer/cursor 235 along the axis perpendicular (y-axis 237) to that used to change the value 220 (x-axis 236) within a predetermined angle, referred to herein as a tolerance angle 238, is ignored. Movement of the modified pointer/cursor 235 along the axis perpendicular (y-axis 237) to that used to change the value 220 (x-axis 236) exceeding the tolerance angle (238) is recognized as an attempt by the user to drag and drop the value 220 into another control 40. Therefore, the system can distinguish between the user's (accidental) drifting off in a perpendicular direction to an attempt to drag and drop the value 220 into another control 40.

In one embodiment, the granularity of the dynamic incrementing and decrementing can be modified using a modifier key on a keyboard. For example, depressing "Shift" while incrementing or decrementing the numeric value 220 increases the rate of scaling the numeric value 220 tenfold. Other keys also may be used to modify the granularity of the dynamic incrementing and decrementing. In one example, depressing and holding a "Command" key, "Command" and "Shift" keys, or "Command" and "Option" keys while incrementing or decrementing the value 220 causes the value 220 to change at different rates. In other examples, other modifier keys may be used to alter the scale of the incrementing or decrementing, for example, to effect logarithmic scaling. In another example, vertical dragging and horizontal dragging respectively provide two different rates of value 220 change.

In one embodiment, the amount by which the value 220 can increase or decrease is theoretically infinite. In this example, the user can modify the value 220 as described above by dragging anywhere on the computer screen. Thus, the numeric value 220 will continue to increase or decrease when the modified pointer/cursor 235 reaches the edge of the user's computer screen. In another embodiment, the amount that the numeric value 220 increases or decreases is constrained within some predetermined range, which is generally an expected range for the associated functionality. In one embodiment, the user can set the minimum and/or maximum value of the useful range by activating a contextual menu 245, for example, by clicking and holding on the decrementer 225 or incrementer 230, if any. Alternatively, the contextual menu may be activated by other mechanisms, such as by clicking and holding in the drag/insertion region 210 to the left (minimum) or right (maximum) of the text box 220; or by clicking while holding down a modifier key; or by right-clicking.

The direct text editing functionality of the control 40 allows the user to change the numeric value 220 displayed in the text box 215 of FIG. 2C by directly editing the text therein. A summary of this functionality is displayed in the two rows of Table 1 in which the starting location of the pointer is the text box. To edit the numeric value 220 directly, the user first activates the region by moving the graphical pointer 205 using a graphical control device such as a mouse to the drag/insertion region 210 and, single- or double-clicking within the region 210. Alternatively, the user can activate the region 210 at anytime by depressing the Return or Enter key on a standard keyboard. In one embodiment, depressing Return or Enter activates the top control 40 of the interface. In one embodiment, depressing Return or Enter activates the control 40 most recently used. A standard cursor 240 is then displayed in the text box 215. In one embodiment, the remainder of the control 40 is made temporarily inactive, e.g., grayed out, shown in FIG. 2C as dotted lines. The user directly edits the numeric value 220 by typing on the keyboard. Using FIG. 2C as an example, if the user next typed the numeral six (6), the numeric value 220 displayed (2.5) changes to 2.56.

In addition, the user can use standard edit functions within the text box 215, such as "cut," "copy," and "paste," or by selecting functions from a standard tool bar, such as "undo." If the user attempts to enter an invalid character into the text box 215, for example a letter instead of a number, an error indication occurs, such as a beep.

In one embodiment, the user can insert both positive and negative values in the text box 215. If the user depresses the "Delete" or "Backspace" button when the text box 215 is in active mode but no text has been entered/replaced, then the entire numeric value 220 will be deleted and a minimum or default value will be displayed. If the user depresses the Delete or Backspace button once editing has commenced, only the character in the position directly to the left of the standard cursor 240 will be removed. If a user depresses a right or left cursor button on the keyboard, the cursor 240 will move right or left one digit. If a user clicks outside of the text box 215 or depresses the Return key or the Tab key, the numeric value 220 is set, the text box 215 is taken out of active mode, and the remainder of the control 40 is again active.

In one example, when the text box 215 is active, the user can depress the Command key with the cursor keys (up, down, left, right) to change the value 215 displayed. Combining these keys with a modifier key, as discussed above, will allow different size increment and decrement steps. In some embodiments, the use of cursor keys to increment or decrement value is the default behavior, and thus does not require depressing Command to effect a change in the value 220.

In one embodiment, the user can use arithmetic functions to change displayed the numeric value 220. For example, if the user wants to multiply the numeric value 220 displayed, for example 2.5 in FIG. 2C, by a factor of five (5), the user can type asterisk five (*5) and the numeric display 220 would change, in this example to 12.5, to reflect the entry. In this example, the system has the ability to distinguish between entering a negative value into the text box 215, for example "−2" (no space between), from the arithmetic function "− 2" (space between minus sign and numeral two).

In one embodiment, the user may Tab through the values 220 of the controls 40 for various parameters 30. Referring now to FIG. 1 as an example, if the user is in text edit mode in the text box 215 of control 40b, and presses the Tab button, the text box 215 of control 40c becomes active. The user can then edit the value 220 of control 40c. When the user is finished, the Tab button can again be depressed to set the value 220 of control 40c and Tab to control 40d.

The control 40 also provides functionality for increasing or decreasing the numeric value 220 displayed in the text box 215 of FIG. 2A in a stepwise manner. A summary of this functionality is displayed in the last two rows of Table 1. To decrease the numeric value 220, the user moves the graphical pointer 205 to the decrementer region 225 and, using a graphical control device such as a mouse, single clicks within the region. As a result, the numeric value 220 displayed decreases by some predetermined amount, referred to herein as a step. Using FIG. 2A as an example, the numeric value 220 displayed (1.00) decrements to 0.99. Likewise, to increase the numeric value 220, the user moves the graphical pointer 205 to the incrementer region 230 and single clicks within the region. As a result, the numeric value 220 displayed increases one step. Using FIG. 2A as an example, the numeric value 220 displayed (1.00) increments to 1.01. Subsequent clicks in the regions would continue to increment and decrement, respectively, the numeric value 220 displayed in a stepwise manner. In one embodiment, holding down the mouse button while the cursor is positioned on the incrementer 230 or decrementer 225 continues to step the value up or down, respectively.

In one embodiment, the granularity of the steps used to increment and decrement the numeric value 220 can be modified using a key on a keyboard. For example, by depressing the "Shift" key on a standard keyboard before clicking on the incrementer 230 or decrementer 225, the increment or decrement step multiplies tenfold. Again using FIG. 2A as an example, depressing Shift and clicking the incrementer 230 would increase the numeric value 220 displayed (1.00) to 1.10. In addition, other keys might be used to modify the granularity of the increment and decrement steps. For example, depressing the "Option" key in conjunction with the incrementer 230 or decrementer 225 multiples the increment or decrement step by a factor of 0.01. In other examples, other modifier keys may be used to alter the increment or decrement step size, for example, to effect logarithmic scaling.

In one embodiment, the user can access recent values that have been displayed in the text box 215. The user can activate a contextual menu 245, for example by right-clicking the mouse over the text box 215, as shown in FIG. 3. Once selected, the menu pops up or drops down to display the recent values for the text box 215. Then, the user can select a recent value to populate the text box 215 with that value.

One embodiment of the control 40 allows the user to change the value 220 by changing the current mouse position. The user moves the graphical pointer and pauses over a control without clicking (an action known as hovering) and the control becomes highlighted without the need to click on that control. For example, the user could hover the graphical pointer 205 over the text box 215 and use the mouse wheel to increase or decrease the value 220 displayed, without the need to first click on the desired control. For example, if the user hovers the graphical pointer 205 over the text box 215 without clicking on it and scrolls the mouse wheel up, the value 220 increments as a result. In addition, the user could hover the graphical pointer 205 over the text box 215 and type into the text box 215 without first clicking on the text box 215. However, the user would need to click and drag to dramatically increment or decrement the value as described above.

Referring now to FIG. 3, there is shown an illustration of a control 40 paired with a slider 50 in accordance with one embodiment of the present invention. In this example, the control 40 and the slider 50 each control the parameter 30. The control 40 functionality described above in conjunction with FIG. 2 is supplemented by slider 50 functionality, in which a control bar 305 moves, horizontally in this example, across a slide bar 310. The movement of the slider 50 changes the numeric value 220 displayed in the text box 215 of the control 40. For example, by sliding the control bar 305 of the slider 50 in a first direction (e.g., to the right) on the slide bar 310, the value 220 displayed in the text box 215 of the corresponding control 40 increases. Likewise, by changing the value 220 using the control 40, the position of the control bar 305 on the slide bar 310 of the slider 50 moves accordingly. The combined control 40 and slider 50 allow the user more options for changing the value 220 of the parameter.

Referring again to FIG. 1, there is shown an illustration of four controls controlling three different parameters in accordance with one embodiment of the present invention. In this embodiment, a single interface 10 contains multiple controls 40 for control of multiple parameters 30. In this example, each parameter 30 can be controlled separately as described above. In addition, two or more parameters 30 can be controlled simultaneously to affect changes in the numeric value 220 of each, referred to herein as parameter ganging. To gang two or more parameters 30, the user selects/highlights a first parameter 50, for example, Position 30a, then clicks on a modifier key, such as the Shift key, and then selects/highlights one or more additional parameters 30, for example Blur 30c. Then, when the value 220 of one of the selected parameters, for example Blur 30c increments up, the value 220 displayed in the text boxes 215 for all selected parameters 30 (here Position and Blur) increment up simultaneously. In this example, the parameters 30 can be ganged even if the parameters 30 control dissimilar aspects of the image.

In addition, the user can drag and drop values 220 from one control 40 to another. For example, if the user wishes to make the value of control 40a (27.00) the same as the value of control 40c (20.00), the user can click in the text box 215 of control 40c and then drag and drop the value into the text box 215 of control 40a. As discussed above, only movement that exceeds the tolerance angle 238 is recognized as an attempt by the user to drag and drop the value 220 into another control 40. Therefore, the system can distinguish between the user's (accidental) drifting off in a perpendicular direction to an attempt to drag and drop the value 220 into another control 40.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of receiving user input for changing a parameter via a graphical user interface, the method comprising:
   displaying a control comprising a drag region, an incrementer region, and a decrementer region, the drag region comprising a text box displaying a value for the parameter;
   in response to receiving user input within the text box and keying in a value, changing the value of the parameter;
   in response to receiving user input within the drag region in a first direction, dynamically incrementing the value of the parameter;
   in response to receiving user input within the drag region in a second direction, dynamically decrementing the value of the parameter;
   in response to receiving user input within the incrementer region, incrementing the value of the parameter; and
   in response to receiving user input within the decrementer region, decrementing the value of the parameter.

2. A computer-implemented method of receiving user input for changing a parameter via a graphical user interface, the method comprising:
   displaying a control comprising a drag region, the drag region comprising a text box displaying a value for the parameter;
   in response to receiving user input within the text box and keying in a value, changing the value of the parameter;
   in response to receiving user input within the drag region in a first direction, dynamically incrementing the value of the parameter;
   in response to receiving user input within the drag region in a second direction, dynamically decrementing the value of the parameter; and
   in response to a user command for displaying recent values, displaying a contextual menu of recent values.

3. The method of claim 2, wherein the user command for displaying recent values is a click and hold.

4. The method of claim 2, wherein the user command for displaying recent values is a right click.

5. The method of claim 2, wherein the user command for displaying recent values is a click combined with a modifier key.

6. A method of receiving user input for changing a parameter via a graphical user interface, the method comprising:
   displaying a control comprising a drag region, the drag region comprising a text box displaying a value for the parameter;
   in response to receiving user input within the text box and keying in a value, changing the value of the parameter;
   in response to receiving user input within the drag region in a first direction, dynamically incrementing the value of the parameter at a first rate;
   in response to receiving user input within the drag region in a second direction, dynamically decrementing the value of the parameter at the first rate;
   in response to receiving user input within the drag region in a third direction, dynamically incrementing the numeric value at a second rate;
   in response to receiving user input within the drag region in a fourth direction, dynamically decrementing the numeric value at the second rate.

7. A method of receiving user input for changing a parameter via a graphical user interface, the method comprising:
   displaying a first control comprising a drag region, the drag region comprising a text box displaying a value for the parameter;
   in response to receiving user input within the text box and keying in a value, changing the value of the parameter;
   in response to receiving user input within the drag region along a first axis, dynamically changing the value of the parameter; and
   in response to receiving user input within the drag region along a second axis, recognizing the user input within the drag region as an attempt by the user to drag and drop the value into a second control.

8. The method of claim 7, wherein the recognizing the user input occurs only when the dragging along the second axis exceeds a tolerance angle from the first axis.

9. A method of receiving user input for changing a parameter via a graphical user interface, the method comprising:
   displaying a control comprising a drag region, the drag region comprising a text box displaying a value for the parameter;
   in response to receiving user input within the text box and keying in a value, changing the value of the parameter;
   in response to receiving user input within the drag region in a first direction, dynamically incrementing the value of the parameter;
   in response to receiving user input within the drag region in a second direction, dynamically decrementing the value of the parameter;
   in response to receiving user input within the drag region at a first side of the text box and a user command for displaying boundaries, displaying a contextual menu to select an upper boundary for the value; and
   in response to receiving user input within the drag region at a second side of the text box and user command for displaying boundaries, displaying a contextual menu to select a lower boundary for the value.

10. The method of claim 9, wherein the user command for displaying boundaries is a click and hold.

11. The method of claim 9, wherein the user command for displaying boundaries is a right click.

12. The method of claim 9, wherein the user command for displaying boundaries is a click combined with a modifier key.

13. A computer program product for receiving user input for changing a parameter via a graphical user interface, the computer program product embodied on a tangible computer readable storage medium comprising:

a software portion configured to display a control comprising a drag region, an incrementer region, and a decrementer region, the drag region comprising a text box displaying a value for the parameter;
a software portion configured to change the value of the parameter in response to receiving user input within the text box and keying in a value;
a software portion configured to dynamically increment the value of the parameter in response to receiving user input within the drag region in a first direction;
a software portion configured to dynamically decrement the value of the parameter in response to receiving user input within the drag region in a second direction;
a software portion configured to increment the value of the parameter in response to receiving user input within the incrementer region; and
a software portion configured to decrement the value of the parameter in response to receiving user input within the decrementer region.

14. A computer program product for receiving user input for changing a parameter via a graphical user interface, the computer program product embodied on a tangible computer readable storage medium comprising:
a software portion configured to display a first control comprising a drag region, the drag region comprising a text box displaying a value for the parameter;
a software portion configured to change the value of the parameter in response to receiving user input within the text box and keying in a value;
a software portion configured to dynamically change the value of the parameter in response to receiving user input within the drag region along a first axis; and
a software portion configured to recognize an attempt by the user to drag and drop the value into a second control in response to receiving user input within the drag region along a second axis.

15. The computer program product of claim 14, wherein the software portion configured to recognize an attempt by the user to drag and drop the value into second control recognizes only input along the second axis greater than a tolerance angle from the first axis.

16. A system for receiving user input for changing a parameter via a graphical user interface, comprising:
a software portion configured to display a control comprising a drag region, an incrementer region, and a decrementer region, the drag region comprising a text box displaying a value for the parameter;
a software portion configured to change the value of the parameter in response to receiving user input within the text box and keying in a value;
a software portion configured to dynamically increment the value of the parameter in response to receiving user input within the drag region in a first direction;
a software portion configured to dynamically decrement the value of the parameter in response to receiving user input within the drag region in a second direction;
a software portion configured to increment the value of the parameter in response to receiving user input within the incrementer region;
a software portion configured to decrement the value of the parameter in response to receiving user input within the decrementer region;
wherein the software portions are embodied on a tangible computer readable storage medium.

17. A system for receiving user input for changing a parameter via a graphical user interface, comprising:
a software portion configured to display a first control comprising a drag region, the drag region comprising a text box displaying a value for the parameter;
a software portion configured to change the value of the parameter in response to receiving user input within the text box and keying in a value;
a software portion configured to dynamically change the value of the parameter in response to receiving user input within the drag region along a first axis;
a software portion configured to recognize an attempt by the user to drag and drop the value into a second control in response to receiving user input within the drag region along a second axis;
wherein the software portions are embodied on a tangible computer readable storage medium.

18. The system of claim 17, wherein the software portion configured to recognize an attempt by the user to drag and drop the value into second control recognizes only input along the second axis greater than a tolerance angle from the first axis.

19. A system for receiving user input for changing a parameter via a graphical user interface, comprising:
means for displaying a control comprising a drag region, an incrementer region, and a decrementer region, the drag region comprising a text box displaying a value for the parameter;
means for changing the value of the parameter in response to receiving user input within the text box and keying in a value;
means for dynamically incrementing the value of the parameter in response to receiving user input within the drag region in a first direction;
means for dynamically decrementing the value of the parameter in response to receiving user input within the drag region in a second direction;
means for incrementing the value of the parameter in response to receiving user input within the incrementer region; and
means for decrementing the value of the parameter in response to receiving user input within the decrementer region.

20. A system for receiving user input for changing a parameter via a graphical user interface, comprising:
means for displaying a first control comprising a drag region, the drag region comprising a text box displaying a value for the parameter;
means for changing the value of the parameter in response to receiving user input within the text box and keying in a value;
means for dynamically changing the value of the parameter in response to receiving user input within the drag region along a first axis; and
means for recognizing an attempt by the user to drag and drop the value into a second control in response to receiving user input within the drag region along a second axis.

21. The system of claim 20, wherein the means for recognizing an attempt by the user to drag and drop the value into second control recognizes only the user input along the second axis greater than a tolerance angle from the first axis.

* * * * *